(No Model.)
J. H. HUNTER.
LIGHTING SYSTEM.
No. 407,210. Patented July 16, 1889.
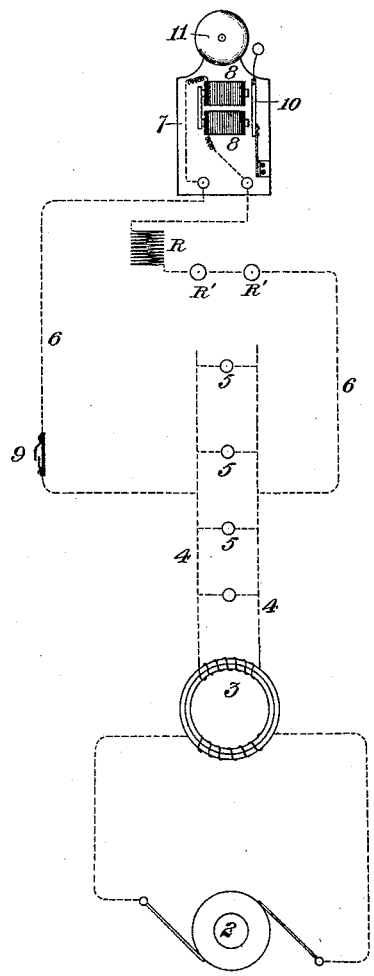
WITNESSES:
INVENTOR,
Joseph H. Hunter
by W. Bakewell & Sons
Att'ys.

UNITED STATES PATENT OFFICE.

JOSEPH H. HUNTER, OF PITTSBURG, PENNSYLVANIA.

LIGHTING SYSTEM.

SPECIFICATION forming part of Letters Patent No. 407,210, dated July 16, 1889.

Application filed May 11, 1889. Serial No. 310,439. (No model.)

*To all whom it may concern:*

Be it known that I, JOSEPH H. HUNTER, of Pittsburg, in the county of Allegheny and State of Pennsylvania, have invented a new and useful Improvement in Electrical Circuits, of which the following is a full, clear, and exact description, reference being had to the accompanying drawing, forming part of this specification, which illustrates in plan view an electrical circuit arranged according to the principles of my invention.

In the drawing, 2 represents a dynamo for the generation of an alternating electrical current.

3 is a converter for converting the current at the place of use from high potential to low potential, and 4 is a lamp-circuit leading from the secondary coil of the converter and provided with a suitable number of lamps 5, arranged in multiple arc in the circuit in the usual way.

6 6 is the circuit of an electric alarm 7, the coils of whose magnets 8 are connected with the conductors of the circuit, as shown in the drawing. This circuit 6 is connected with the lamp-circuit 4 in parallel with the lamps, and is provided with suitable resistance devices, which have the effect of limiting to a very small quantity the current which can be diverted from the lamp-circuit through the magnets. This resistance may be of any convenient form. For example, it may consist of coils of fine wire or of a suitable number of lamps interposed in series in the circuit. For illustrating the invention, I have shown both such forms of resistance—namely, a wire coil R and lamps R'.

9 is a circuit closer or switch, (preferably a push-button,) interposed in the circuit 6. The armature 10 of the magnets 8 is arranged in front of the pole-pieces of the magnets in the manner shown in the drawing, and is not provided with a circuit-breaker—such as are usually employed with bells used in circuit with galvanic batteries—the vibration of the armature being caused by its alternate repulsion and attraction due to the use of the alternating current as the motive agent.

The vibrations of the armature may be employed to sound an electric bell or any other suitable form of signal.

The operation of the circuit is as follows: The generator 2 generates continuously an alternating current for use in the lamp-circuit, and when the button 9 is pushed a portion of the current is diverted into the circuit 6, and passes through the magnets 8, causing in the pole-pieces of such magnets a rapid alternation of polarity. The alternate attractions and repulsions of the armature 10 thus induced cause its rapid vibration and sound the bell 11. Of course, if as much current as is needed to supply a single lamp were passed through the magnets 8 parts of the apparatus would be excessively heated or burned out; but by means of the resistance R or R' the amount of current passed through the magnets may be limited to a very small fraction of the amount used to supply a lamp.

The apparatus is designed especially for use in buildings lighted by lamps using an alternating current, and its advantages are that it entirely dispenses with the necessity for using batteries, the elements of which need frequent repairing and attention. It is clear that the amount of current needed to supply the bell-circuit is small, and is measured by the meter commonly used in the lamp-circuit, so that the system is one involving very trifling cost over that of the original wiring, and the apparatus employed being of the simplest nature is not apt to get out of order.

I claim as my invention—

1. The combination of an electrical generator of alternating currents, a lamp-circuit, and an alarm or signal having a magnet or magnets connected in parallel with the lamp-circuit and having a vibratory armature, substantially as and for the purposes described.

2. The combination of an electrical generator of alternating currents, a lamp-circuit, an alarm or signal having a magnet or magnets connected in parallel with the lamp-circuit, and resistance devices arranged in circuit with said magnets, substantially as and for the purposes described.

In testimony whereof I have hereunto set my hand this 5th day of April, A. D. 1889.

JOSEPH H. HUNTER.

Witnesses:
W. B. CORWIN,
THOMAS W. BAKEWELL.